(12) United States Patent
Sakaniwa et al.

(10) Patent No.: US 9,676,664 B2
(45) Date of Patent: Jun. 13, 2017

(54) CEMENT PRODUCTION APPARATUS

(71) Applicant: MITSUBISHI MATERIALS CORPORATION, Chiyoda-ku (JP)

(72) Inventors: Daisuke Sakaniwa, Naka (JP); Yoshinori Takayama, Naka (JP); Junzhu Wang, Naka (JP)

(73) Assignee: MITSUBISHI MATERIALS CORPORATION, Chiyoda-ku (JP)

( * ) Notice: Subject to any disclaimer, the term of this patent is extended or adjusted under 35 U.S.C. 154(b) by 146 days.

(21) Appl. No.: 14/417,276

(22) PCT Filed: Aug. 9, 2013

(86) PCT No.: PCT/JP2013/071656
§ 371 (c)(1),
(2) Date: Jan. 26, 2015

(87) PCT Pub. No.: WO2014/034417
PCT Pub. Date: Mar. 6, 2014

(65) Prior Publication Data
US 2015/0274590 A1   Oct. 1, 2015

(30) Foreign Application Priority Data

Aug. 28, 2012   (JP) .................................. 2012-187322

(51) Int. Cl.
*F27B 15/08*     (2006.01)
*C04B 7/44*      (2006.01)
(Continued)

(52) U.S. Cl.
CPC ............ *C04B 7/4469* (2013.01); *C04B 7/432* (2013.01); *F27B 7/2016* (2013.01);
(Continued)

(58) Field of Classification Search
CPC .......... C10J 2300/0946; E01C 19/1009; E01C 19/10
(Continued)

(56) References Cited

U.S. PATENT DOCUMENTS 3,140,862 A * 7/1964 Schoppe .................. B01J 8/386
                                                    34/363
3,761,582 A    9/1973 Lippmann
(Continued)

FOREIGN PATENT DOCUMENTS

FR        1 254 835      2/1961
FR        2 109 337      5/1972
(Continued)

OTHER PUBLICATIONS

Extended European Search Report issued Mar. 29, 2016 in Patent Application No. 13833084.0.
(Continued)

*Primary Examiner* — Gregory A Wilson
(74) *Attorney, Agent, or Firm* — Oblon, McClelland, Maier & Neustadt, L.L.P.

(57) ABSTRACT

Providing a cement production apparatus in which raw material is supplied into a duct with being dispersed uniformly so that heat-exchanging efficiency is improved by even preheating and clogging and the like are prevented, so that stable operation can be carried out.

Between cyclones at an upper stage and a cyclone at a lower stage disposed below cyclones at an upper stage, a duct 21 is provided to introduce exhaust gas to the cyclones at the upper stage with distributing after flowing upward from the cyclone at the lower stage; at a lower position than a distribution part 23 of the duct 21, a material-supplying pipe 22 is connected for supplying cement raw material; at a connected part of the material-supplying pipe 22 to the duct
(Continued)

21, a material-guiding chute 24 on which the cement raw material is supplied from the material-supplying pipe 22 and which drops it into the duct 21 is provided with protruding into the duct 21; and the material-guiding chute 24 is formed to have a flat upper surface and to be expandable by sliding so that insertion depth of a tip end 24a from an inner-wall surface 21b of the duct 21 is 0.15 to 0.5 times of an inner diameter of the duct 21.

9 Claims, 8 Drawing Sheets

(51) Int. Cl.
*C04B 7/43* (2006.01)
*F27B 7/20* (2006.01)
*F27D 13/00* (2006.01)
*F27B 7/32* (2006.01)

(52) U.S. Cl.
CPC .......... *F27B 7/2025* (2013.01); *F27B 7/3205* (2013.01); *F27D 13/00* (2013.01)

(58) Field of Classification Search
USPC .......... 432/14, 15, 58, 106; 366/23; 106/739
See application file for complete search history.

(56) References Cited

U.S. PATENT DOCUMENTS

| | | | |
|---|---|---|---|
| 4,050,883 A | | 9/1977 | Goldmann et al. |
| 4,071,309 A | * | 1/1978 | Yamane ................ F27B 7/2033 432/106 |
| 4,088,438 A | * | 5/1978 | Deussner .............. F27B 7/2033 432/106 |
| 4,249,892 A | | 2/1981 | Brachthäuser et al. |
| 4,295,823 A | * | 10/1981 | Ogawa ...................... C04B 7/43 106/745 |
| 4,568,276 A | * | 2/1986 | Fujisawa ............... F27B 7/2025 106/744 |
| 4,640,681 A | * | 2/1987 | Steinbiss ............... C04B 7/4446 106/745 |
| 4,720,262 A | * | 1/1988 | Durr ..................... F27B 7/2033 432/106 |
| 4,747,879 A | * | 5/1988 | Wolter .................. F27B 7/2033 106/756 |
| 5,944,513 A | * | 8/1999 | Yokota .................. F27B 7/2025 432/106 |
| 6,402,848 B1 | | 6/2002 | Horiguchi et al. |
| 2002/0022207 A1 | * | 2/2002 | Streit ..................... C04B 7/434 432/15 |
| 2015/0020400 A1 | | 1/2015 | Sakaniwa et al. |
| 2015/0049572 A1 | | 2/2015 | Sakaniwa et al. |

FOREIGN PATENT DOCUMENTS

| | | |
|---|---|---|
| FR | 2 310 320 | 12/1976 |
| FR | 2 336 650 | 7/1977 |
| JP | 54 56658 | 4/1979 |
| JP | 61 30156 | 9/1986 |
| JP | 62 4879 | 2/1987 |
| JP | 62 112986 | 5/1987 |
| JP | 62 29919 | 7/1987 |
| JP | 6 191615 | 7/1994 |
| JP | 7 17332 | 3/1995 |
| JP | 9 202656 | 8/1997 |
| JP | 9 262452 | 10/1997 |
| JP | 2001 35799 | 2/2001 |
| JP | 2012 214309 | 11/2012 |

OTHER PUBLICATIONS

International Search Report Issued Nov. 5, 2013 in PCT/JP13/071656 Filed Aug. 9, 2013.

* cited by examiner (a)

(b)

CEMENT PRODUCTION APPARATUS

BACKGROUND OF THE INVENTION

Field of the Invention

The present invention relates to an apparatus of producing cement clinker by burning cement raw material in a kiln while supplying to a preheater.

Priority is claimed on Japanese Patent Application No. 2012-187322, filed Aug. 28, 2012, the content of which is incorporated herein by reference.

Description of the Related Art

In a cement production apparatus, a preheater is provided for pre-heating cement raw material. The preheater is configured by a plurality of cyclones connected in a vertical direction in which the cyclone at a lowermost stage is connected to a kiln inlet part of a cement kiln. The cement raw material is pulverized by a mill, and then is supplied to the preheater from a duct connecting the cyclone at a top stage and the cyclone at a lower stage at a middle position of the preheater. In the preheater, the cement raw material is introduced into the cyclone at the top stage being carried by exhaust gas rising from the cement kiln, then fallen into each of the cyclones sequentially so as to be pre-heated by a heat of the exhaust gas, and finally supplied to the cement kiln from the cyclone at the lowermost stage.

When the cement raw material is supplied to the duct, since the plurality of cyclones are provided above the duct, it is necessary to supply the material equally in order to pre-heat equally in the cyclones.

As an apparatus which supplies powder such as the cement raw material, there are apparatuses described in Patent Document 1 to Patent Document 3 in which improvement of dispersibility is contrived.

In an apparatus described in Patent Document 1, on an upper surface of a lower-end part of a bottom plate of a material-supplying pipe (i.e., an inclined chute) supplying powder of cement raw material, a mountain-shape protruded part protruding as a probability curve is formed. The protruded part is formed so that a highest part is at a lower-end side and a height at an upper-stream side is zero, so that the material is supplied into a duct being divided to left-and-right by hitting against the protruded part.

In Patent Document 2, a dispersing device of powder material is proposed in which a dispersing plate is provided at a connecting part between a material-supplying pipe (i.e., a charge chute) and a duct (i.e., a duct) so as to be protruded to a half of an inner diameter of the charge chute at a maximum by angular-displacement around a horizontal axis. In Patent Document 3, a device in which a material-slide surface is formed in substantially orthogonal direction to a gas flow at a connecting part between a material-supplying pipe (i.e., a material chute) and a duct (i.e., a heated-gas duct) is disclosed. In Patent Document 4, a device in which a dispersing plate is protruded in a duct is disclosed.

In the devices disclosed in Patent Documents 2 to 4, the material is supplied with being dispersed into the duct by hitting against the dispersing plate protruding in the duct or the material-side surface. In Patent Document 5, a device in which a material-dispersion box is provided at a connecting part between a material-supplying pipe and a duct for dispersing and repelling material which falls in a material chute is disclosed.

PRIOR ART DOCUMENT

Patent Document

Patent Document 1: Japanese Unexamined Patent Application, First Publication No. H06-191615
Patent Document 2: Japanese Unexamined Patent Application, First Publication No. H09-262452
Patent Document 3: Japanese Examined Utility Model (Registration) Application, Publication No. S62-29919
Patent Document 4: Japanese Examined Utility Model (Registration) Application, Publication No. S61-30156
Patent Document 5: Japanese Examined Utility Model (Registration) Application, Publication No. S62-4879

SUMMARY OF THE INVENTION

Problems to be Solved by the Invention

However, in those devices of Patent Documents 1 to 4, since the protruded part or the dispersing plate are provided for dispersion at the lower end part of the material-supplying pipe or in the duct, it is tend to cause occurring of choking or the like. Moreover, when the is dispersing plate is arranged in the duct, the dispersing plate may become resistance to a flow of the exhaust gas rising from below so that a stable operation may be obstructed. In the device disclosed in Patent Document 5, the material is repelled and dispersed at an outer peripheral part of the duct, so that deviation is likely to occur in supply of the material into the duct.

The present invention is achieved in consideration of the above circumstances, and has an object to provide a cement production apparatus in which heat-exchanging efficiency can be improved by supplying material with uniformly dispersing into a duct so as to equalize preheating and to prevent clogging and in which stable operation can be carried out.

Means for Solving the Problem

According to the present invention, a cement production apparatus includes: a plurality of cyclones vertically connected to each other in which exhaust gas generated in a cement kiln flows; a duct provided between the cyclones at an upper stage and the cyclone at a lower stage being provided below the cyclones at the upper stage among the cyclones, the duct in which the exhaust gas drained from the cyclone at the lower stage flows upward, distributing and introducing the exhaust gas to the cyclones at the upper stage; a material-supplying pipe for supplying cement raw material, connected to the duct below a distribution part among the cyclones at the upper stage; and a material-guiding chute protruding into the duct from a connection part of the material-supplying pipe to the duct so as to drop the cement raw material being supplied from the material-supplying pipe into the the duct: and in the cement production apparatus, the material-guiding chute is formed to have a flat upper surface and to be expandable by sliding so that insertion depth of a tip end from an inner-wall surface of the duct is 0.15 times to 0.5 times of an inner diameter of the duct.

The cement raw material is supplied from the material-supplying pipe so as to be thrown at substantially a center part of the duct by sliding the material-guiding chute. In the duct, exhaust gas from the cyclone at the lower stage rises as a swirl flow. In the swirl flow, a velocity vector of a swirl direction is small and a vertical upward velocity vector is dominant in the center part; so that the material thrown at the center part rises along with a rising ingredient, while being gently dispersed outward by centrifugal force in a radial direction and equally diffused. Accordingly, the cement raw material is supplied substantially equally to the cyclones at the upper stage.

In this case, since the cement raw material supplied from the material-supplying pipe is caught by the material guiding chute, and introduced into the duct, the cement raw material can be supplied with precisely aiming at a supplying position in the duct by the tip end of the material-guiding chute. As a result, the cement raw material can be certainly supplied at substantially the center part of the duct and can be supplied equally to the cyclones at the upper stage.

In a case of a tubular chute, the cement raw material is tend to be converged at a center of an arc-shaped inner bottom surface and fall as mass, so that the cement raw material is not readily carried by an upward flow in the duct; as a result, there is a case in which the raw material is directly fallen to the cyclone at the lower stage (hereinafter, this phenomenon is called "direct falling".) This direct falling of the raw material remarkably deteriorates heat-exchanging efficiency between the raw material and the exhaust gas. Meanwhile, the material-guiding chute of the present invention is formed to have the flat upper surface; so that the cement raw material is prevented from falling as a mass, can be carried certainly on the upward flow in the duct, and the direct falling of the raw material can be prevented.

Moreover, it is not obstructed that the exhaust gas flows upward in the duct since an insertion depth of the material-guiding chute into the duct is limited to a half of the inner diameter of the duct.

In the cement production apparatus according to the present invention, the material-guiding chute may be inclined at an angle of 60° or larger and 75° or smaller to a pipe-axis direction of the duct.

By inclining the material-guiding chute at the angle of 60° or larger and 75° or smaller, the raw material can be released substantially at the center part of the duct from the tip end by inertia. As a result, the raw material is carried upward along with a vertical-upward vector ingredient generated at the center part, and dispersed and supplied equally to the cyclones at the upper stage.

In the cement production apparatus according to the present invention: a vertical distance from a horizontal plane including the distribution part of the duct to the tip end of the material-guiding chute may be 2.25 times or larger of the inner diameter of the duct; and a distance from an upper end of the cyclone at the lower stage to the tip end of the material-guiding chute may be 1.0 times or larger of the inner diameter of the duct.

Since the vertical distance from the horizontal plane including the distribution part to the tip end of the material-guiding chute is in the above-mentioned range, the raw material can be stable dispersed at a center part of the swirl flow when it is released at the center part of the duct from the tip end of the material-guiding chute; so that the raw material can be supplied equally to the cyclones from the distribution part. If the vertical distance from the horizontal plane including the distribution part of the duct to the tip end of the material-guiding chute is too short in comparison with the inner diameter of the duct, distribution is not uniform, and temperature loads on the cyclones at the upper stage are uneven. Also, if the distance from the upper end of the cyclone at the lower stage to the tip end of the material-guiding chute is too short, the raw material supplied from the material-guiding chute falls to the cyclone at the lower stage, so that the heat-exchanging efficiency between the exhaust gas and the raw material is remarkably deteriorated.

In the cement production apparatus according to the present invention, a lower surface of the material-guiding chute may be formed as a protruded surface which protrudes downward gradually from both side edges toward a center in a width direction. Since the lower surface of the material-guiding chute is formed as the protruded surface, resistance against the upward flow of the exhaust gas is reduced, so that the exhaust gas can flow more smoothly.

Effects of the Invention

According to the cement production apparatus of the present invention, since the cement raw material can be supplied with uniformly dispersing in the preheater, it is possible to even pre-heating of the cement raw material. If a gas-temperature difference at cyclone outlets of the preheater at a top stage is 100° C. or higher for example, heat-consumption rate is increased at least 3 kcal/kg-cli (heat-consumption rate per 1 kg of clinker) or larger: accordingly, it is possible by the apparatus according to the present invention to reduce the heat-consumption rate. Moreover, by a simple structure in which the tip end of the material-guiding chute is inserted in the duct, stable operation can be carried out.

DETAILED DESCRIPTION OF THE INVENTION

Below, embodiments of a cement production apparatus according to the present invention will be described with reference to be drawings.

Figure 7:
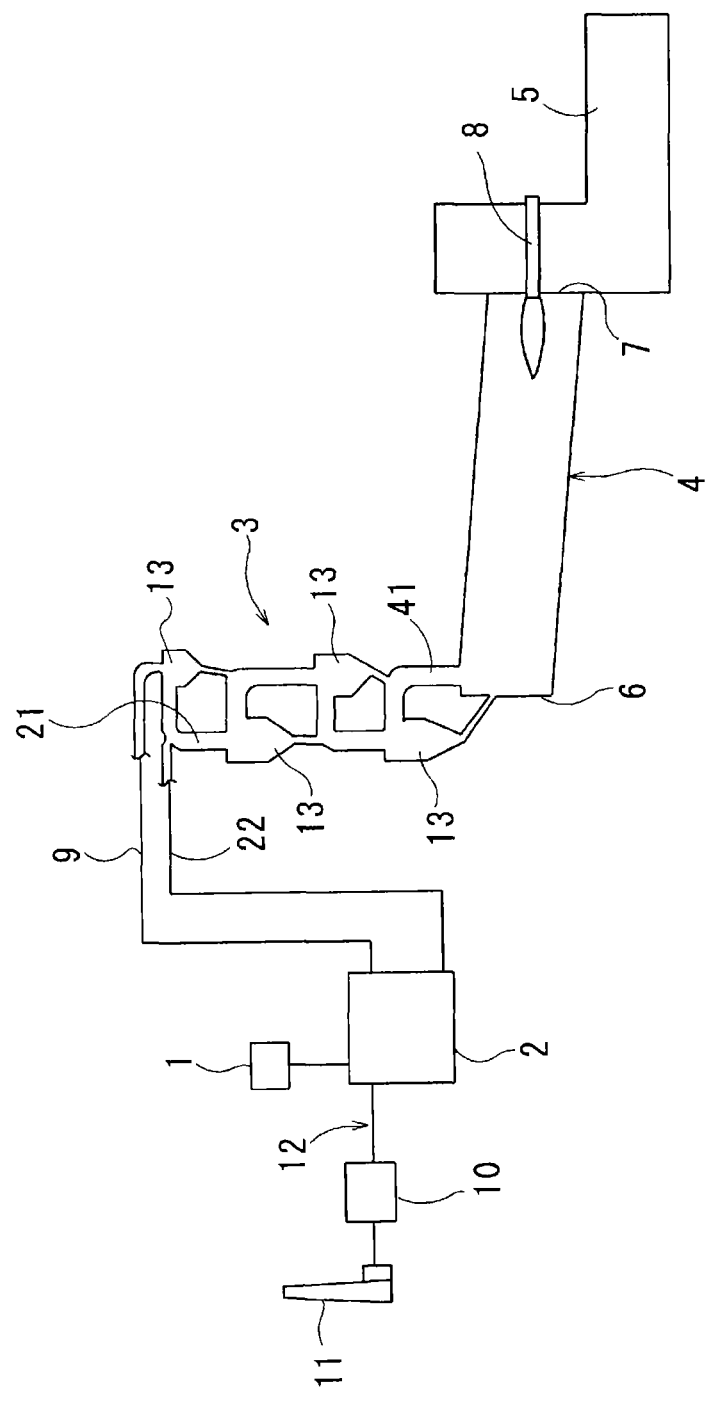
FIG. 7 It is a schematic structural view generally showing the cement production apparatus.

As generally shown in FIG. 7, a cement production apparatus is provided with: a material bunker 1 particularly storing limestone, clay, silica, ferrous material and the like as cement raw material; a raw mill-and-dryer 2 milling and drying the cement raw materials; a preheater 3 preheating the powdery cement raw material obtained in the raw mill; a cement kiln 4 burning the cement raw material pre-heated by the preheater 3; a cooler 5 to cool cement clinker after burning in the cement kiln 4, and the like.

The cement kiln 4 is a rotary kiln having a lateral-cylindrical shape slightly inclined. In the cement kiln 4 rotating around an axis: the cement raw material supplied from the preheater 3 to a kiln inlet part 6 is sent to a kiln outlet part 7; cement clinker is generated by heating and burning the cement raw material to about 1450° C. by a burner 8 in the kiln outlet part 7 in the sending process; and then the cement clinker is sent out to the cooler 5 from the kiln outlet part 7. The cement clinker is cooled to prescribed temperature in the cooler 5, and sent to a finishing process.

Exhaust gas which is generated in the cement kiln 4 flows upward in the preheater 3 from a lower part through a rising duct 41, and then is introduced into the raw mill-and-dryer 2 through an exhaust pipe 9. By introducing the exhaust gas from the cement kiln 4, the raw mill-and-dryer 2 grinds and dries the cement raw material simultaneously. The raw mill-and-dryer 2 is connected to an exhaust-gas line 12 having a dust collector 10, a chimney 11 and the like.

The preheater 3 is constructed by vertically connecting a plurality of cyclones 13 in which the exhaust gas generated in the cement kiln 4 flows. The cyclone 13 at a lowermost stage of the preheater 3 is connected to the kiln inlet part 6 of the cement kiln 4.

In FIG. 7, the structure of the preheater 3 is simply illustrated. The preheater 3 of the present embodiment is constructed from the cyclones 13 of four vertical stages. In this case, the two cyclones 13 are provided in parallel (not shown) at a third stage from a bottom (hereinafter, "the third stage"); and with respect to one of the two cyclones 13, the two cyclones 13 are connected in parallel (not shown) at a fourth stage from the bottom, i.e., at a top stage (hereinafter, "the top stage" or "the fourth stage"). That is, the cyclones 13 at the top stage are provided at four in total so that each of the two cyclones 13 at the third stage is connected to the two cyclones 13. The preheater 3 may be made from a different structure from the above-mentioned structure.

Figure 3:
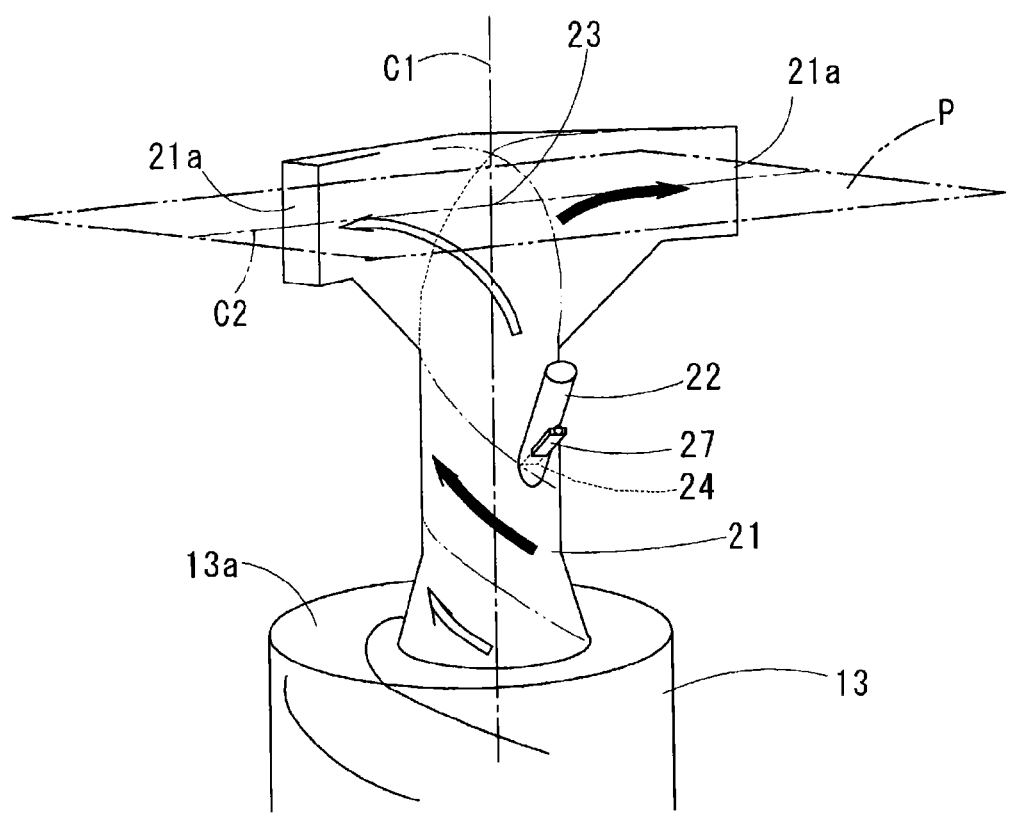
FIG. 3 It is a schematic view sterically showing a flow of exhaust gas in a duct.

In the preheater 3, the two-parallel cyclones 13 at the top stage and the one cyclone 13 at the third stage are connected by a duct 21. The duct 21 is extended vertically upward from the cyclone 13 at the third stage, then branched to left-and-right through a distribution part 23 to form a T-shape as a whole, and connected to the two cyclones 13 at the upper stage respectively. A material-supplying pipe 22 is connected to the duct 21 so as to supply the raw material from the raw mill- and dryer 2. In FIG. 3, only the cyclone 13 at the lower stage is illustrated; an upper part of the duct 21 is illustrated up to an outlet 21a; and the cyclone 13 at the upper stage is omitted.

Figure 4:
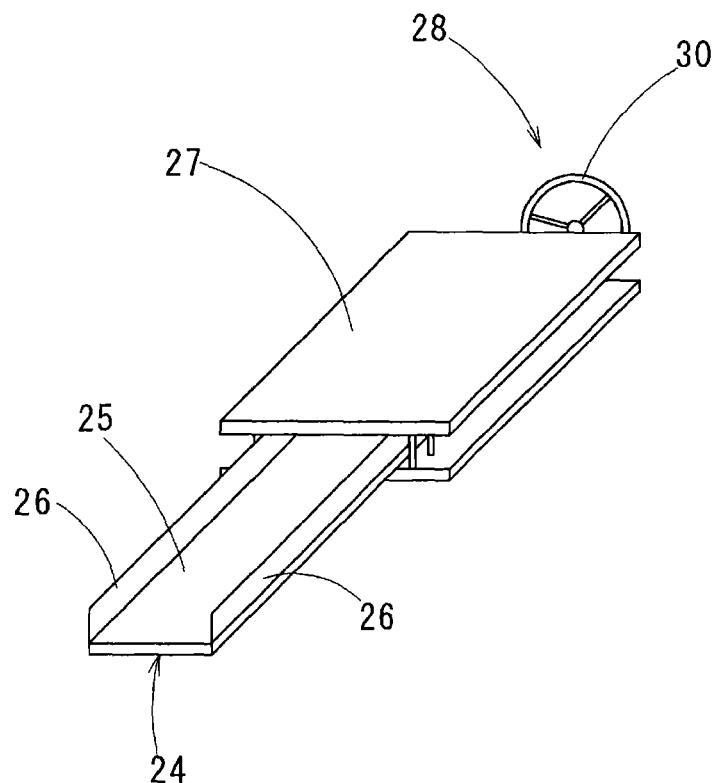
FIG. 4 It is a perspective view of a material-guiding chute.
Figure 5:
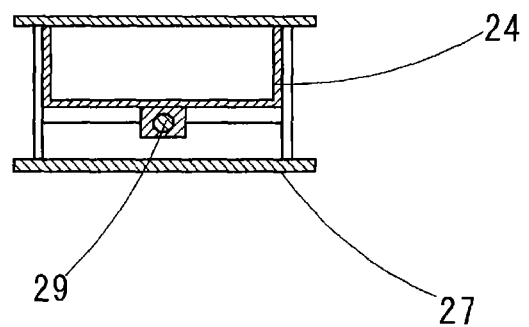
FIG. 5 It is a transverse cross-sectional view of the material-guiding chute.

A connection part between the material-supplying pipe 22 and the duct 21 is provided at a lower position than the distribution part 23 of the duct 21. At this connection part, a material-guiding chute 24 protruding into the duct 21 is provided (FIG. 3). As shown in FIG. 4 and FIG. 5, the material-guiding chute 24 is formed to have a gutter-shape from a bottom-plate part 25 having a belt-plate shape and side-plate parts 26 standing at both sides of the bottom-plate part 25. The material-guiding chute 24 is slidably held at a base end on a supporting part 27 being fixed on an outer surface of the material-supplying pipe 22, and penetrates a wall of the material-supplying pipe 22 so as to be inserted in the duct 21. On the supporting part 27, an operation part 28 is provided for moving the material-guiding chute 24 in a longitudinal direction. In the illustrated example, the operation part 28 has a structure for moving the material-guiding chute 24 by rotating a feed screw 29 by a handle 30.

Figure 1:
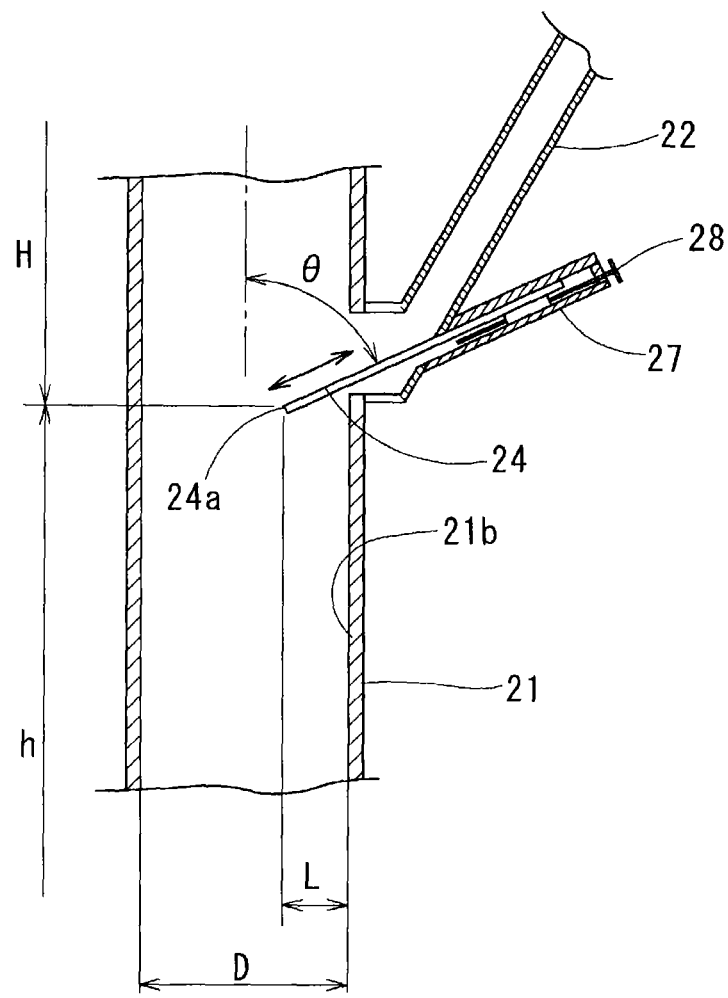
FIG. 1 It is a vertical cross-sectional view at a vicinity of a material-supplying pipe in an embodiment of a cement production apparatus according to the present invention.

In this case, as shown in FIG. 1, a vertical distance "H" from a horizontal plane P including the distribution part 23 of the duct 21 (refer to FIG. 3) to a tip end 24a of the material-guiding chute 24 is 2.25 times or larger of an inner diameter "D" of the duct 21; a distance "h" from a top end 13a of the cyclone 13 at the third stage (refer to FIG. 3) to the tip end 24a of the material-guiding chute 24 (refer to FIG. 1) is 1.0 times or larger of the inner diameter "D" of the duct 21. The distribution part 23 is an intersection point at which an axis C1 of the duct 21 meets a line C2 linking centers of the outlets 21a to both the cyclones at the upper stage (refer to FIG. 3).

Figure 2:
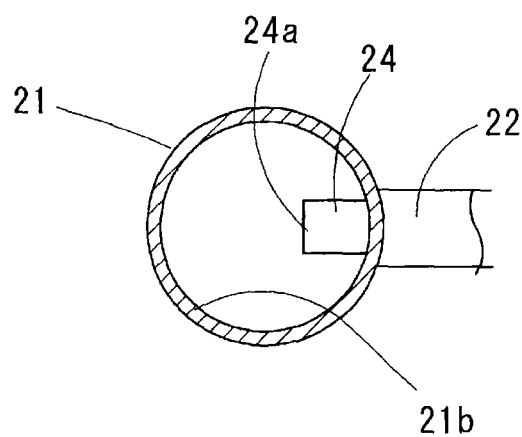
FIG. 2 It is a transverse cross-sectional view of FIG. 1.

The material-guiding chute 24 is formed to be inclined at an appropriate angle "θ" of 60° to 75° to a pipe-axis direction of the duct 21 as shown in FIG. 1 and FIG. 2. The cement raw material supplied from the material-supplying pipe 22 is received at the material-guiding chute 24, and descends from the material-guiding chute 24 so as to be dropped into the duct 21. The tip end 24a of the material-guiding chute 24 is protruded so that insertion depth "L" from an inner-wall surface 21b of the duct 21 is 0.15 to 0.5 times of the inner diameter "D" of the duct 21.

In the cement production apparatus constructed as above, when the cement raw material is supplied from the material bunker 1, the cement raw material is milled and dried in the raw mill-and-dryer 2, charged in the preheater 3 from the material-supplying pipe 22, and then supplied to the lower cement kiln 4 while descending in the preheater 3. In the preheater 3, the exhaust gas from the cement kiln 4 flows upward sequentially in the cyclones 13 from the lower part along a counter direction to the cement raw material, so that the cement raw material is pre-heated by the exhaust gas from the cement kiln 4 while passing through the cyclones 13 to prescribed temperature (for example, 900° C.). The pre-heated cement raw material is supplied to the kiln inlet part 6 of the cement kiln 4 from the cyclone 13 at the lowermost stage.

It will be further described to supply the cement raw material from the material-supplying pipes 22. In the duct 21 to which the material-supplying pipes 22 are connected, the exhaust gas rising from the cyclone 13 of the lower stage (the third stage) flows, so that the cement raw material is introduced into the cyclone 13 of the upper stage (the fourth stage) by being carried by the flow. Meanwhile, the exhaust gas generated by combustion in the cement kiln 4 rises in the preheater 3 as a swirl flow by the cyclones 13. The cement raw material is supplied from the material-supplying pipes 22 and is dropped into the swirl flow.

Figure 6:
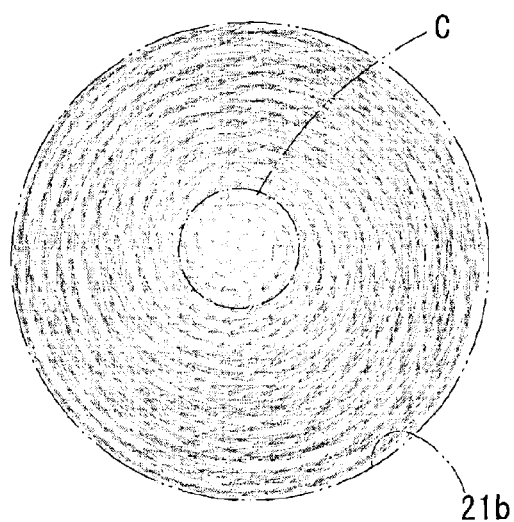
FIG. 6 It shows velocity vectors of gas flow at a transverse cross-section in the duct by computation; a part (a) is a plan view and a part (b) is a lateral view.
Figure 6:
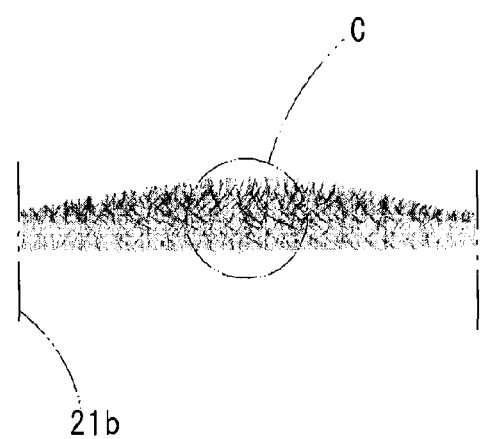

As shown by velocity vectors in a transverse cross-sectional direction in a part (a) of FIG. 6, the swirl flow has large velocity vectors of a circumferential direction in the vicinity of the inner-wall surface 21b of the duct 21; and as it approaches a center part "C" of the duct 21, constituents of the circumferential direction become small and vertically-upward velocity vectors become large as shown in a part (b) of FIG. 6.

As shown in a schematic view shown in FIG. 3, the swirl flow flows in the duct 21 from the cyclone 13 at the lower stage, is distributed into two at the distribution part 23, and flows in the two cyclones 13 of the upper stage respectively.

One flow into one of the two cyclones is illustrated by black arrows, and the other flow into the other cyclone is illustrated by white arrows. In the duct 21, these rise spirally while being twisted. Finally, arriving at the distribution part 23 after rising in the duct 21, these are introduced into the cyclones 13 respectively in a state of being branched from the distribution part 23.

As described above, since two flows are the swirl flow spirally rising in the duct 21, if the cement raw material is unevenly dropped to only one flow of them, it is supplied mostly to only one of the two cyclones of the upper stage. As a result, a load is increased only in the one cyclone 13.

In the cement production apparatus according to the present invention, the material-supplying pipe 22 is connected to a lower position than the distribution part 23 of the duct 21 in which the exhaust gas from the cyclone 13 at the third stage is distributed to the two cyclones 13 at the fourth stage; the material-guiding chute 24 is slidably provided at the connection part of the material-supplying pipe 22 to the duct 21; the tip end 24a of the material-guiding chute 24 is protruded from the inner-wall surface 21b of the duct 21 in the length range of 0.15 to 0.5 times of the inner diameter "D" of the duct 21, so that the raw material can be dropped into the center part "C" of the swirl flow in the duct 21. As described above, the velocity vectors in the circumferential direction are small and the vertical velocity upward vectors are dominant at the center part "C"; so that the dropped raw material is gently dispersed radially outward while rising along with the rising flow, and supplied evenly to both the cyclones 13 at the fourth stage from the distribution part 23.

Accordingly, the loads of both the cyclones are balanced, so that respective pre-heating states of the cement raw material supplied to the cyclones can be equalized. When gas-temperature difference between outlets of the cyclones 13 at the top stage of the preheater 3 exceeds 100° C. or higher for example, a heat-consumption rate (per kg of clinker) is increased at least 3 kcal/kg-cli or more. By equalizing the pre-heating states as in the apparatus of the present invention, the temperature difference is decreased so that the heat-consumption rate can be reduced.

Furthermore, since the material-guiding chute 24 is slidable, it is possible to control a position of the tip end 24a of the material-guiding chute 24 so as to minimize the gas-temperature difference between the outlets 21a of the duct 21 connected to the cyclones 13 while detecting the gas-temperature difference. As a result, it is possible to supply the cement raw material to an ideal position.

In this case, since an upper surface of the material-guiding chute 24 is formed as a flat surface by the bottom-plate part 25, the cement raw material received from the material-supplying pipe 22 can be dropped to the duct 21 without being converged in one place, and it is reliable to be carried by the rising flow in the duct 21.

As for the vertical distance "H" from the horizontal plane "P" including the distribution part 23 of the duct 21 to the tip end 24a of the material-guiding chute 24, by setting H/D to 2.25 or larger with respect to the inner diameter "D" of the duct 21, it is possible to improve an effect of equalization when setting the insertion depth "L" of the material-guiding chute 24 into the duct 21 to the above-described range. As for the distance "h" from the upper end 13a of the cyclone 13 at the lower stage, it is maintained to 0.5 times of the inner diameter "D" of the duct 21 or larger in order not to directly drop the raw material to the cyclone 13 at the lower stage. Therefore, the position of the material-guiding chute 24 in the duct 21 is set in the whole length of the duct 21 so that the vertical distance "H" from the material-guiding chute 24 to the horizontal plane "P" including the distribution part 23 and the distance "h" along a vertical direction to the cyclone 13 at the lower stage have the above-described relation with respect to the inner diameter "D" of the duct 21 respectively.

Figure 8:
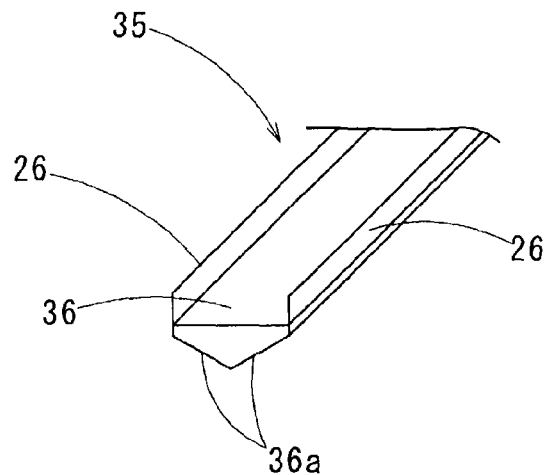
FIG. 8 It is a perspective view of a material-guiding chute of another embodiment according to the present invention.
Figure 9:
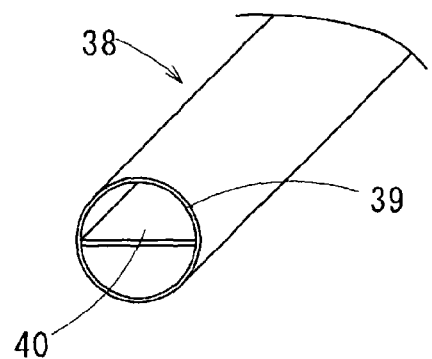
FIG. 9 It is a perspective view of a material-guiding chute of a yet another embodiment according to the present invention.

FIG. 8 and FIG. 9 show another embodiment of a material-guiding chute of a cement production apparatus according to the present invention.

A material-guiding chute 35 shown in FIG. 8 is formed to have: a bottom-plate part 36 having a triangular cross section; a flat upper surface; and an inclined undersurface 36a facing downward. Resistance to the swirl flow rising from a lower part is small because of the inclined undersurface 36a, so that a stable operation can be carried out with preventing clogging and the like. The undersurface may be an arc surface by forming the bottom-plate part to have a semicircular cross section.

Meanwhile, a material-guiding chute 38 shown in FIG. 9 is provided so that a plate 40 crosses an inside of a pipe 39 at a tip end protruding in the duct 21; so that raw material falls in a space enclosed by the pipe 39 and an upper surface of the plate 40. Since an outer surface is formed by the pipe 39, it is similar to the material-guiding chute 35 shown in FIG. 8 in that the resistance to the swirl flow in the duct 21 is small. The cross-sectional shape of the pipe 39 may be an oval or a lozenge-shape.

As described above, by forming the undersurface of the material-guiding chute as the protruded surface protruding downward gradually from both the side edges toward the center in a width direction, the flow of the exhaust gas in the duct 21 can be smoothed.

EXAMPLES

The ratio L/D of the insertion depth "L" of the material-guiding chute of the material-supplying pipe with respect to the inner diameter "D" of the duct was set to five steps, 0, 0.22, 0.33, 0.4, and 0.5. The ratio h/D of the distance "h" from the top end of the cyclone at the lower stage to the tip end of the material-guiding chute was fixed to 0.9 or 1.0. Outlet temperature was measured at the left and right of the duct passed through the distribution part; and the temperature difference was found out. It is desirable that there be no temperature difference.

As conditions, gas of air volume of 14300 $Nm^3$/hour and temperature of 640° C. was supplied to the cyclone at the third stage; and the cement raw material of air volume of 1400 $Nm^3$/hour and temperature of 80° C. was supplied to the material-supplying pipe with 30.4 ton/hour. The inclined angle "θ" of the material-supplying pipe was 70°, the vertical distance "H" from the horizontal plane including the distribution part of the duct to the tip end of the material-supplying pipe was 2.9 times of the inner diameter "D" of the duct.

Figure 10:
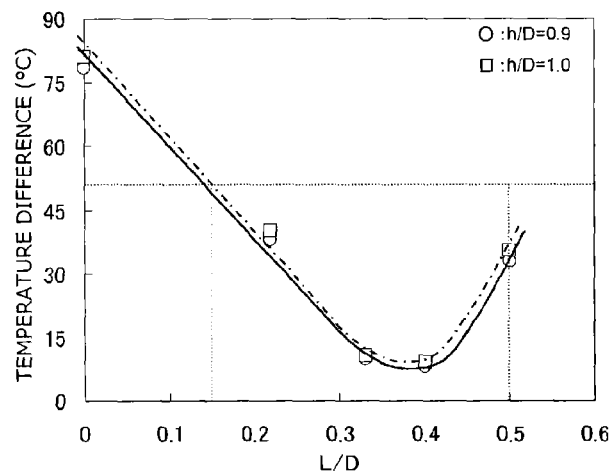
FIG. 10 It is a graph showing a computation of temperature differences at an outlet of the duct with respect to a ratio of an insertion depth (a slide length) of the material-guiding chute into the duct to an inner diameter of the duct.

FIG. 10 shows results. A horizontal axis indicates the ratio L/D of the insertion depth "L" of the material-guiding chute to the inner diameter "D" of the duct. A vertical axis indicates the temperature difference (° C.).

As found from the results shown in FIG. 10, when the ratio L/D of the insertion depth "L" of the material-guiding chute to the inner diameter "D" of the duct is in a range of 0.15 to 0.5, the temperature difference of the outlets is substantially 50° C. or lower, and the temperature difference is most small at the vicinity of 0.35 to 0.40 of L/D. In FIG. 10, L/D=0.00 when the tip end of the material-supplying pipe was open at the inner wall surface of the duct. In such a structure, it was found that the temperature difference at the outlets of the duct was large as about 80° C.; and the loads on the cyclones were uneven.

Practically, by inserting the material-supplying pipe so as to protrude in a length range of 0.15 to 0.5 times of the inner diameter "D" of the duct, the raw material can be substantially evenly distributed.

Next, the mounting angle "θ" of the material-guiding chute was set to steps in a range of 50° to 90° with respect to the pipe-axis direction of the duct. The outlet temperature was measured at the left and right of the duct passed through the distribution part; and the temperature difference was found out. Furthermore, it was examined that occurrence of the direct falling of the raw material from the material-guiding chute to the cyclone at the lower stage.

Figure 11:
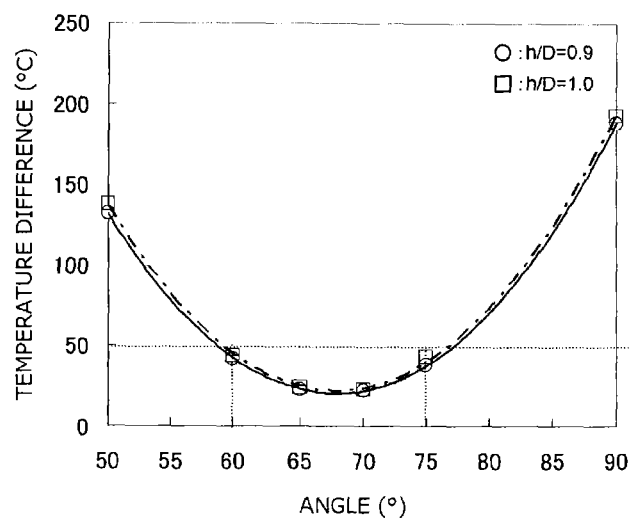
FIG. 11 It is a graph of when L/D is 0.3, showing a result of computation of a relation between a mounting angle of the material-guiding chute with respect to the duct and temperature difference at a duct outlet.

The ratio L/D of the insertion depth "L" of the material-guiding chute with respect to the inner diameter "D" of the duct was fixed to 0.3. The ratio h/D of the distance "h" from the top end of the cyclone at the lower stage to the tip end of the material-guiding chute and the inner diameter "D" of the duct was fixed to 0.9 or 1.0. The air volume, the temperature and the like of the gas were the same as afore-mentioned condition. TABLE 1 and FIG. 11 show result. In FIG. 11, a horizontal axis indicate the angle "θ") (°) of the guiding to chute with respect to the pipe-axis direction of the duct; a vertical axis indicates the temperature difference (° C.).

Figure 12:
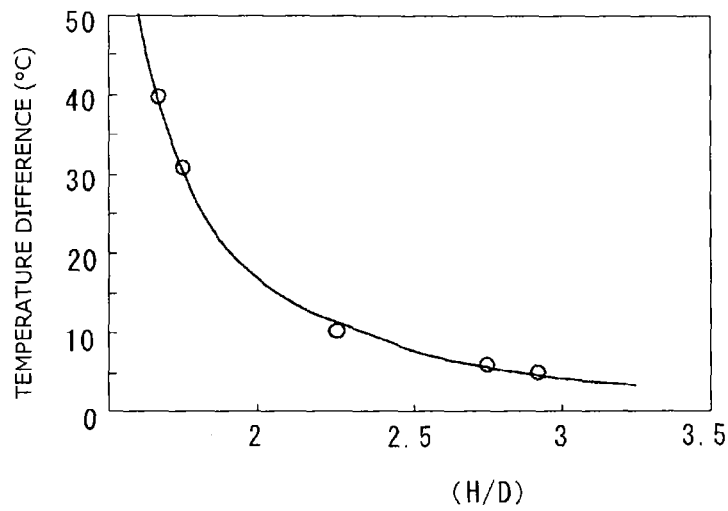
FIG. 12 It is a graph of when L/D is 0.3, showing a result of computation of a relation between a ratio of a vertical distance from a flat plane including a distribution part to a tip end of the material-supplying pipe to an inner diameter of the duct and temperature difference at a duct outlet.

"D" of the duct was fixed to 1.0; and the mounting angle "θ" of the material-guiding chute to the pipe-axis direction of the duct was fixed to 75°. The air volume, the temperature and the like of the gas were the same as as afore-mentioned condition. FIG. 12 shows result. A horizontal axis indicates the ratio H/D of the vertical distance from the horizontal plane P including the distribution part to the tip end of the material-supplying pipe with respect to the inner diameter of the duct; a vertical axis indicates the temperature difference (° C.).

From the results shown in FIG. 12, when the ratio H/D of the vertical distance "H" from the horizontal plane including the distribution part to the tip end of the material-supplying pipe with respect to the inner diameter "D" of the duct was smaller than 2.25, as the ratio H/D was smaller, the temperature difference between the outlets was acutely increased: when it was 2.25 or larger, the temperature difference was stable substantially at 10° C. or lower.

Figure 13:
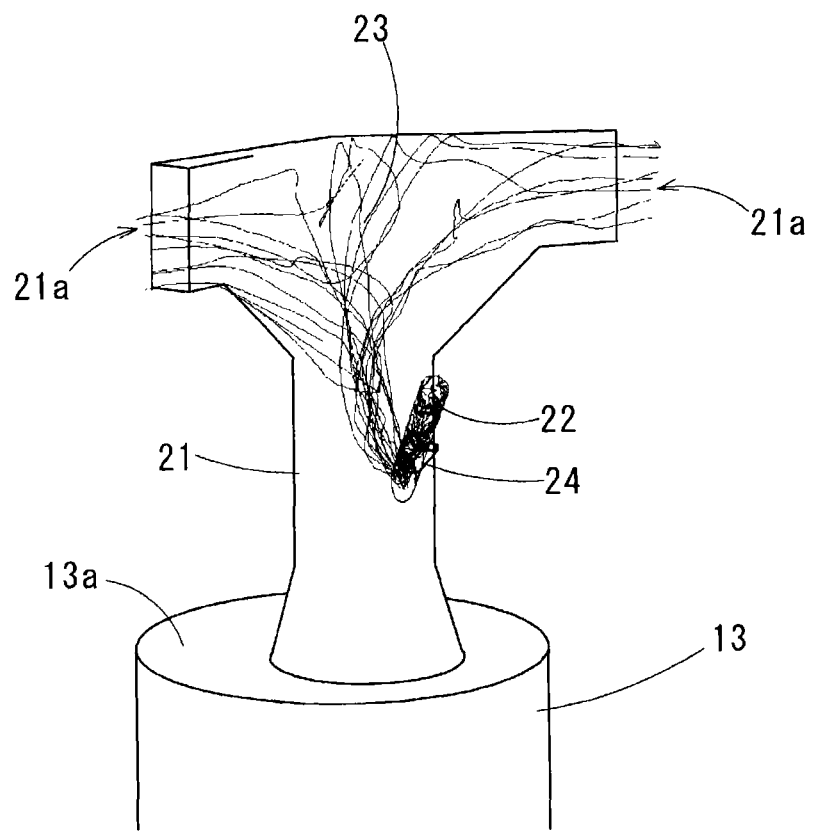
FIG. 13 It is a schematic view showing a flow of raw material supplied from the material-supplying pipe in the duct.

FIG. 13 indicates simulation of flow only of material particles when the material-guiding chute was protruded at a position of the vertical distance "H" which is 2.9 times of the inner diameter "D" of the duct from the distribution part of the duct (H/D=2.9) with the insertion depth "L" of substantially ⅓ of the dinner diameter "D" of the duct (L/D≈⅓). It was found from the figure that the raw material was evenly distributed to the left and right.

TABLE 1

| MOUNTING ANGLE OF MATERIAL-GUIDING CHUTE (°) | h/D = 0.9 | | h/D = 1.0 | |
| --- | --- | --- | --- | --- |
| | TEMPERATURE DIFFERENCE AT OUTLETS OF LEFT AND RIGHT OF DUCT (° C.) | DIRECT FALLING TO CYCLONE AT LOWER STAGE | TEMPERATURE DIFFERENCE AT OUTLETS OF LEFT AND RIGHT OF DUCT (° C.) | DIRECT FALLING TO CYCLONE AT LOWER STAGE |
| 90 | 188 | NO | 193 | NO |
| 75 | 38 | NO | 43 | NO |
| 70 | 22 | NO | 23 | NO |
| 65 | 23 | NO | 24 | NO |
| 60 | 42 | SLIGHTLY EXISTED | 44 | NO |
| 50 | 132 | EXISTED | 138 | EXISTED |

From the results shown in TABLE 1 and FIG. 11, when the mounting angle "θ" of the material-guiding chute to the pipe-axis direction of the duct is in a range of 60° or larger and 75° or smaller, the temperature difference between the outlets of the duct can be reduced to 50° C. or lower for example.

Furthermore, when the ratio h/D of the distance "h" from the top end of the cyclone at the lower stage to the tip end of the material-guiding chute to the inner diameter "D" of the duct was 1.0 or larger, the direct falling to the cyclone at the lower stage was not existed when the mounting angle of the material-guiding chute was in a range of 60° to 90°.

Next, the ratio H/D of the vertical distance "H" from the horizontal plane P including the distribution part of the duct to the tip end of the material-guiding pipe with respect to the inner diameter "D" of the duct was set to five steps, 1.65, 1.75, 2.25, 2.75, and 2.9. The outlet temperature was measured at the left and right of the duct passed through the to distribution part as above-mentioned; and the temperature difference was found out. The ratio L/D of the insertion depth "L" of the material-guiding chute to the inner diameter "D" of the duct was fixed to 0.3; the ratio h/D of the distance "h" from the top end of the cyclone at the lower stage to the tip end of the material-guiding chute to the inner diameter The present invention is not limited to the above-described embodiments and various modifications may be made without departing from the scope of the present invention.

For example, it was described that the raw material is supplied to the duct connected to the cyclone at the top stage; however, the present invention can also be practical in a case in which the raw material is supplied to ducts connected to a plurality of cyclones installed at each of stages; or a case in which the raw material is supplied to the rising duct 41 connecting the cyclone at the lowermost stage to the kiln inlet part 6 of the cement kiln (refer to FIG. 7).

Moreover, the present invention can be practical not only for a structure in which raw material is supplied to the cyclone at the top stage introduced from the mill as cement raw material, but also for a structure in which the raw material is supplied to the duct while being preheated and introduced to the lower cyclone after passing through the upper cyclone.

Furthermore, the present invention includes a case of using a duct which supplies and distributes the raw material to three or more cyclones.

The distribution part of the embodiment has two outlets. However, the present invention can be practical regardless of a number of the outlet of the distribution part. Furthermore, the structure is not limited to a T-shape, the effect of the present invention can be obtained even if it is Y-shape or the like.

The present invention can be used for equipment handling powder other than producing cement.

INDUSTRIAL APPLICABILITY

It can be applied as a cement production apparatus in which stable operation can be carried out by uniformly dispersing the cement raw material into the preheater.

DESCRIPTION OF REFERENCE SYMBOLS 3 preheater
4 cement kiln
5 cooler
6 kiln inlet part
13 cyclone
13a top end
21 duct
21a outlet
21b inner-wall surface
22 material-supplying pipe
23 distribution part
24 material-guiding chute
24a tip end
25 bottom-plate part
26 side-plate part
27 supporting part
28 operation part
29 feed screw
30 handle
35 material-guiding chute
36 bottom-plate part
36a undersurface
38 material-guiding chute
39 pipe
40 plate
41 rising duct

What is claimed is:

1. A cement production apparatus comprising:
a plurality of cyclones vertically connected to each other, and in which exhaust gas generated in a cement kiln can flow;
a duct provided between cyclones at an upper stage and a cyclone at a lower stage among said plurality of cyclones, wherein the duct is provided below the cyclones at the upper stage and provides a distribution part among the cyclones at the upper stage, and wherein exhaust gas flowing from the cyclone at the lower stage flows upward in the duct and is distributed to the cyclones at the upper stage;
a material-supplying pipe for supplying cement raw material connected to the duct at a position below the distribution part among the cyclones at the upper stage; and
a material-guiding chute protruding into the duct from a connection part of the material-supplying pipe to the duct, so as to drop the cement raw material being supplied from the material-supplying pipe into the duct, wherein
the material-guiding chute is formed to have a flat upper surface and to be expandable by sliding so that an insertion depth of a tip end of the material-guiding chute from an inner-wall surface of the duct at the connection part is 0.15 times to 0.5 times an inner diameter of the duct.

2. The cement production apparatus according to claim 1, wherein
the flat upper surface of the material-guiding chute is inclined at an angle of 60° or larger and 75° or smaller to a pipe-axis direction of the duct.

3. The cement production apparatus according to claim 2, wherein:
a vertical distance from a horizontal plane including the distribution part of the duct to the tip end of the material-guiding chute is 2.25 times or larger than the inner diameter of the duct; and
a distance from an upper end of the cyclone at the lower stage to the tip end of the material-guiding chute is 1.0 times or larger than the inner diameter of the duct.

4. The cement production apparatus according to claim 3, wherein a lower surface of the material-guiding chute is formed as a protruded surface which protrudes downward gradually from both side edges toward a center in a width direction.

5. The cement production apparatus according to claim 2, wherein a lower surface of the material-guiding chute is formed as a protruded surface which protrudes downward gradually from both side edges toward a center in a width direction.

6. The cement production apparatus according to claim 1, wherein:
a vertical distance from a horizontal plane including the distribution part of the duct to the tip end of the material-guiding chute is 2.25 times or larger than the inner diameter of the duct; and
a distance from an upper end of the cyclone at the lower stage to the tip end of the material-guiding chute is 1.0 times or larger than the inner diameter of the duct.

7. The cement production apparatus according to claim 6, wherein a lower surface of the material-guiding chute is formed as a protruded surface which protrudes downward gradually from both side edges toward a center in a width direction.

8. The cement production apparatus according to claim 1, wherein a lower surface of the material-guiding chute is formed as a protruded surface which protrudes downward gradually from both side edges toward a center in a width direction.

9. The cement production apparatus according to claim 1, wherein the cyclones at the upper stage comprise parallel arranged cyclones whose material outlets are connected at the distribution part.

* * * * *